United States Patent
Preston et al.

(10) Patent No.: US 9,772,027 B2
(45) Date of Patent: Sep. 26, 2017

(54) VARIABLE BAFFLE THAT REDUCES OIL AT THE GEAR MESH

(71) Applicant: GM Global Technology Operations LLC, Detroit, MI (US)

(72) Inventors: Christopher B. Preston, Troy, MI (US); David J. Varda, West Bloomfield, MI (US); Mohammad A. Hotait, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 141 days.

(21) Appl. No.: 14/878,289

(22) Filed: Oct. 8, 2015

(65) Prior Publication Data

US 2017/0102064 A1    Apr. 13, 2017

(51) Int. Cl.
*F16H 57/04*    (2010.01)

(52) U.S. Cl.
CPC ..... *F16H 57/0423* (2013.01); *F16H 57/0457* (2013.01)

(58) Field of Classification Search
CPC .......................... F16H 57/0423; F16H 57/0457
See application file for complete search history.

(56) References Cited

U.S. PATENT DOCUMENTS

| | | | |
|---|---|---|---|
| 3,529,698 A * | 9/1970 | Nelson | B61C 17/08 184/11.2 |
| 4,270,497 A * | 6/1981 | Valerio | F01M 11/0004 123/195 C |
| 4,470,324 A * | 9/1984 | Renk | F16H 57/0423 277/409 |
| 4,519,348 A * | 5/1985 | Hamilton | F01M 11/0004 123/195 C |
| 4,842,100 A | 6/1989 | Cameron et al. | |
| 5,038,631 A | 8/1991 | Renk et al. | |
| 6,223,616 B1 | 5/2001 | Sheridan | |
| 6,299,561 B1 * | 10/2001 | Kramer | F16H 57/0447 184/13.1 |
| 6,647,578 B2 | 11/2003 | Morgan et al. | |
| 7,421,921 B2 | 9/2008 | Kimura et al. | |
| 7,686,137 B2 | 3/2010 | Tominaga et al. | |
| 7,883,439 B2 | 2/2011 | Sheridan et al. | |
| 7,894,791 B2 | 2/2011 | Chang et al. | |
| 8,393,248 B2 | 3/2013 | Nagahama et al. | |
| 8,707,826 B2 * | 4/2014 | Jacobs | F16H 57/0447 74/606 A |
| 8,746,405 B2 * | 6/2014 | Perakes | F16H 57/0409 184/6.12 |

(Continued)

*Primary Examiner* — Michael Riegelman

(57) ABSTRACT

A variable baffle for controlling a flow of oil at a gear mesh includes a first baffle member fixed proximate to the gear teeth of a first rotating gear. A second baffle member is rotatably connected to the first baffle member. A third baffle member is fixed proximate to a second rotating gear and aligned with the second baffle member when the second baffle member is in a closed position. A rotating member rotatably connects the second baffle member to the first baffle member. The second baffle member is movable away from the closed position to an open position when the force of a fluid expelled from the gear teeth of the first rotating gear exceeds a force applied to the rotating member normally acting to move the second baffle member toward the closed position.

19 Claims, 2 Drawing Sheets

(56) References Cited

U.S. PATENT DOCUMENTS

Figure 1:
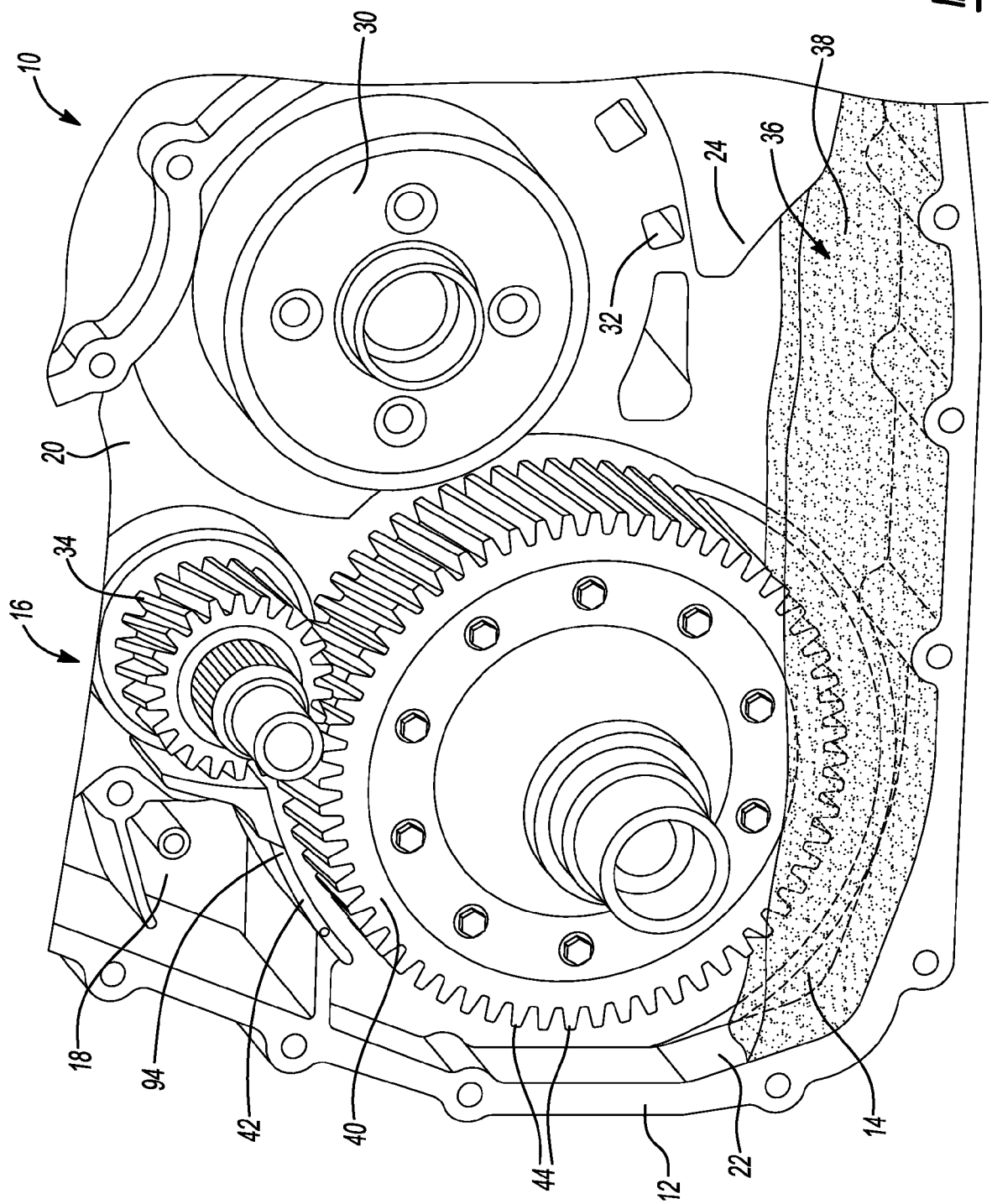

| | | | |
|---|---|---|---|
| 8,899,381 B2* | 12/2014 | Ebihara | B60K 7/0007 |
| | | | 184/6.12 |
| 8,935,853 B2 | 1/2015 | Sheridan et al. | |
| 9,038,779 B2 | 5/2015 | McCune et al. | |
| 9,551,247 B2* | 1/2017 | Michel | F01M 11/064 |
| 2005/0103570 A1* | 5/2005 | Gibson | F16H 57/0421 |
| | | | 184/6.12 |
| 2009/0090096 A1 | 4/2009 | Sheridan | |
| 2009/0165587 A1* | 7/2009 | Ariga | F16H 57/0423 |
| | | | 74/467 |
| 2010/0180721 A1* | 7/2010 | Quehenberger | F16H 57/0419 |
| | | | 74/606 R |
| 2013/0102432 A1 | 4/2013 | Imai et al. | |
| 2017/0030457 A1* | 2/2017 | Hotait | F16H 57/0423 |

\* cited by examiner

VARIABLE BAFFLE THAT REDUCES OIL AT THE GEAR MESH

FIELD

The present disclosure relates to a transmission gear baffle that permits directed flow of fluid resulting from gear rotation in a fluid bath.

BACKGROUND

The statements in this section merely provide background information related to the present disclosure and may or may not constitute prior art.

Powertrains in motor vehicles require lubrication and cooling using a hydraulic fluid or oil to continuously operate. More specifically, the engine and especially a transmission require lubricating and cooling fluids or oils to maintain their operation and extend their useful life. The fluid is communicated throughout the transmission via hydraulic passages. This fluid, or oil is transferred by a pump, such as for automatic, CVT, or other transmissions, and may be used for splash lubrication, such as for manual, DCT, or other transmissions.

A gear rotating in a fluid or oil medium such as in the pan will induce a fluid flow. This flow is arbitrary in nature and can collect on other rotating or non-rotating components. The thrown hydraulic fluid, being uncontrolled, causes splash from contact with other components, steady fluid flow, and/or different fluid flows. The fluid can directly impinge onto the gear mesh of adjacent gears, or can splash back onto the rotating assembly and induce drag from the fluid impact. In addition, fluid coming in contact with a rotating component can resist its motion causing additional drag and loss of power.

Fluid existence at the gear mesh can induce additional losses associated with the work done to squeeze, or pump, the fluid as it flows through the gear mesh teeth.

The loss associated with fluid resistance to flow is known as churning loss while that of thrown fluid is referred to as fluid impact loss. The consequence of too much fluid on rotation is more than mere friction. Fluid impacting on the rotating parts has a mass which must be accelerated during engine acceleration which therefore acts as a loss on efficiency.

In addition, splashing fluid leads to aeration of the fluid. High proportions of entrapped air in oil or hydraulic fluid can in turn lead to pump cavitation and excessive softness, for example in hydraulic-actuator force-versus-displacement characteristics. Entrapped air can also reduce the effectiveness of fluid lubrication and cooling properties. Accordingly, there is a need in the art for a device which allows deflecting and directionally controlling at least a portion of fluid flow caused by a gear or rotating component in a fluid bath for a later use and/or to reduce fluid splash, drag losses and aeration.

SUMMARY

According to several aspects of the present disclosure, a variable baffle for controlling a flow of oil at a gear mesh includes a first baffle member fixed proximate to the gear teeth of a first rotating gear. A second baffle member is rotatably and linearly connected to the first baffle member. A rotating member rotatably and linearly connects the second baffle member to the first baffle member. The second baffle member moves away from the closed position to an open position when the force of a fluid expelled from the gear teeth of the first rotating gear exceeds a force applied to the rotating member normally acting to move the second baffle member toward the closed position.

In another example of the present disclosure, a third baffle member is positioned proximate to the second baffle member and oppositely from the first baffle member, the third baffle member aligned with the second baffle member when the second baffle member is in a closed position.

In yet another example of the present disclosure, the third baffle member includes a seating surface extending from the third baffle member directly contacted by the second baffle member to define the closed position.

In yet another example of the present disclosure, the rotating member is a spring defining a hinge.

In yet another example of the present disclosure, the spring includes a spring arm contacting the second baffle member.

In yet another example of the present disclosure, the rotating member is a living hinge.

In yet another example of the present disclosure, the rotating member is an electronically operated hinge.

In yet another example of the present disclosure, the second baffle member defines a door having a concave shaped surface facing the gear teeth of the rotating gear.

In yet another example of the present disclosure, the concave shaped surface of the door has a radius of curvature greater than a radius of curvature of the gear teeth.

In yet another example of the present disclosure, a portion of the fluid expelled from the gear teeth of the first rotating gear is directed through an opening created between the second baffle member and the third baffle member when the second baffle member is displaced to the open position to impinge on and be redirected by the convex shaped surface away from the second rotating gear.

In yet another example of the present disclosure, a control system is connected to and directs movement of the rotating member.

In yet another example of the present disclosure, the control system includes a speed sensor operating to measure a rotational speed of the first rotating gear.

Further examples and advantages of the present disclosure will become apparent by reference to the following description and appended drawings wherein like reference numbers refer to the same component, element or feature.

DRAWINGS

The drawings described herein are for illustration purposes only and are not intended to limit the scope of the present disclosure in any way.

Figure 2:
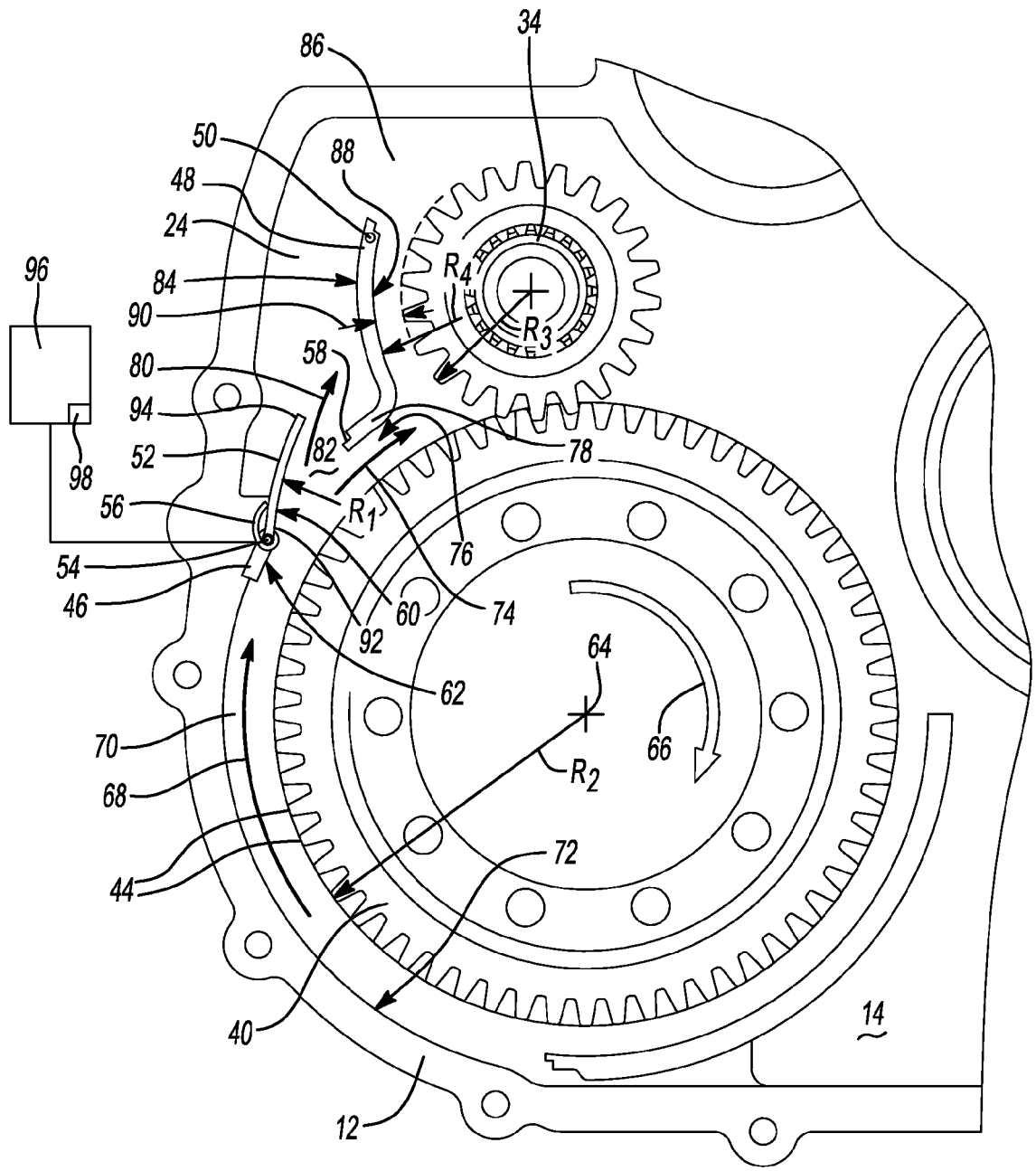

FIG. 1 is a partial, isometric cross-sectional view of an exemplary automatic transmission having a gear baffle according to the principles of the present disclosure; and FIG. 2 is a front elevational view of an embodiment of the gear baffle of FIG. 1.

DETAILED DESCRIPTION

With reference to FIG. 1, a portion of an exemplary transmission is generally indicated by reference number 10. The transmission 10 may be a multiple speed, automatic, continuously variable (CVT), DCT, or manual shifting transmission. The transmission 10 depicted is a front wheel drive automatic transmission, though it should be appreciated that the transmission 10 may be a rear wheel drive transmission without departing from the scope of the present disclosure.

The transmission 10 generally includes a transmission case 12 that houses a sump section 14 and a gear train section 16.

The transmission case 12 can be a cast, metal housing which encloses and protects the various components of the transmission 10. The transmission case 12 includes a variety of apertures, passageways, shoulders and flanges which position and support these components. More specifically, the transmission case 12 defines an axially extending central cavity 18 that includes a front portion 20 and a rear portion 22. The front portion 20 is preferably sized to enclose a hydrodynamic fluid drive device (not shown), such as a conventional torque converter or fluid coupling device. The rear portion 22 extends axially away from the front portion 20. The rear portion 22 is preferably sized to enclose the gear train section 16.

The transmission case 12 also includes a lower case wall 24 that separates the gear train section 16 from the sump section 14. The lower case wall 24 includes a plurality of case drain holes or windows that communicate between the gear train section 16 and the sump section 14. A plurality of case drain holes allow for the communication of hydraulic fluid from the gear train section 16 to the sump section 14.

The sump section 14 is located underneath the gear train section 16 and generally includes a dry or wet sump, not specifically shown, as well as various hydraulic controls and valves (in the case of automatic/CVT transmissions). The sump section 14 is used to collect and store the hydraulic fluid that is subsequently distributed throughout the transmission 10.

The gear train section 16, as noted above, includes rotating components operable to transmit torque from an engine of the motor vehicle to a final drive train in a plurality of forward and reverse gear ratios, as is known in the art. These components are not shown specifically in FIG. 1 in order to provide clarity to the figure. However, an exemplary rotating component, indicated by reference number 30, is shown. The rotating component 30 is, in the example provided, an input shell that encircles other rotating components, such as planetary gears, rotating clutches or brakes, and/or rotating shafts or other members. The rotating component 30 includes a plurality of slots 32 that allow hydraulic fluid to communicate through the rotating component 30. In the example provided, the rotating component 30 is coupled to a second rotating member or gear 34 such as a helical gear (shown). The rotating member 34 may be in turn coupled to a final drive gear 40 such as for example a helical gear shown. The final drive gear 40 may be at least partially immersed in a volume or bath 36 of a fluid 38 such as hydraulic fluid present in the sump section 14. According to several aspects of the present disclosure, a variable baffle 42 is installed proximate to the final drive gear 40 as will be described in greater detail below.

The baffle 42 in a closed position shown is impinged by a fluid such as oil or transmission fluid that is contacted by gear teeth 44 of the final drive gear 40 as it rotates through the sump section 14. The oil travels about the perimeter of the final drive gear and impinges on the gear teeth of the gear 34, which at higher operating speeds results in fluid squeezing or pumping loss. As noted above, a further consequence of too much fluid impacting the gear 34 is the mass of fluid changes direction and therefore must be accelerated both at steady operation and during engine acceleration, which therefore acts as a loss on efficiency of the transmission.

Referring now to FIG. 2 and again to FIG. 1, the variable baffle 42 according to the principles of the present disclosure is a three piece assembly located proximate to the final drive gear 40, in a position also proximate to the gear 34, leaving clearance for meshed engagement between the gear 34 and the final drive gear 40. The three piece assembly of baffle 42 includes a first fixed member 46 spatially separated from a second fixed member 48. Each of the first and the second fixed members 46, 48 may be connected such as by fasteners 50 to the lower case wall 24. A door 52 is rotatably connected to the first fixed member 46 by rotating member such as a hinge member 54. The three piece assembly of baffle 42 therefore includes the first fixed member 46 defining a first piece or first member, the door 52 defining a second piece or second member, and the second fixed member 48 defining a third piece or third member.

According to several aspects, the rotating member is a biasing member such as a spring having a spring arm 56 that normally contacts and biases the door 52 toward the closed position shown in FIG. 1. According to further aspects, the hinge member 54 or rotating member can alternately be provided as a living hinge joining the first fixed member 46 to the door 52.

To retain the door 52 at the closed position, a seating surface 58 such as a door seat extending away from the second fixed member 48 can be provided, which is directly contacted by the door 52 to provide a positive stop for the door 52 in the door closed position. According to further aspects, the hinge member 54 or rotating member can be located at the position of the seating surface 58 and therefore connected to the second fixed member 48, such that the door 52 will rotate oppositely than when the hinge member 54 is located as shown. A stop (not shown) or other means can also be included to provide a positive limit to door travel in the door opening direction.

The door 52 can have a concave curved surface 60 facing the gear teeth 44, the surface 60 having a radius of curvature which is larger than a radius of curvature of the gear teeth 44. The first fixed member 46 can also include a concave curved surface 62 facing the gear teeth 44, which is aligned with the surface 60 when the door 52 is in the closed position. It is also noted that any of the individual fixed parts of the baffle 42 can be included as a part of the transmission case, or provided separately. When the door 52 opens, the oil can be directed to a separate or integral oil trough or oil catcher so the oil can be used to feed other components. According to further aspects, the door 52 can also be provided as multiple doors in multiple separate or individual planes, for example to accommodate a gear having multiple gear mesh surfaces.

During operation of the transmission 10, the final drive gear 40 rotates about an axis of rotation 64 in a clockwise direction indicated by a direction of rotation arrow 66. Oil or fluid in the sump section 14 is picked up by the gear teeth 44 and forced to flow as a total flow 68 within a narrow curved passage 70 created between the gear teeth 44 and an inner wall 72 of the transmission case 12. At increasing flow velocity the fluid in path defined by the total flow 68 will include a component acting based on a centrifugal force of its motion outwardly against the surface 60 of the door 52. When the centrifugal force of the fluid exceeds the biasing force of the hinge member 54, the door 52 will begin to displace away from the closed position toward an open position shown in FIG. 2.

At this time, a first portion of the total flow 68 will divide and continue as a second flow 74 through a passage 76 created between the gear teeth 44 and an interior facing wall 78 of the second fixed member 48, and impinge the gear 34. The second flow 74 is provided to maintain a source of lubrication fluid for the gear 34. Also at this time, a second portion of the total flow will divide and continue as a third flow 80 through an opening 82 created between the first and the second fixed members 46, 48 as the door 52 opens. The opening 82 can vary in size depending on several factors, including: a length of the door 52; a degree of rotation of the door 52 about the hinge member 54 based on the impingement force of the fluid; and the biasing force of the hinge member 54.

A size of the opening 82 will increase as the centrifugal force of the fluid acting against the surface 60 increases with increasing operating speed of the final drive gear 40. The biasing force provided by the hinge member 54, for example as a biasing force of the spring 56, can be predetermined to provide a range of sizes of the opening 82 to maintain the volume of flow desired as the second flow 74 portion of the total flow 68, with the balance of the total flow 68 being redirected as the third flow 80 outward of the second fixed member 48, and therefore away from contact with the gear 34. The third flow 80 contacts a convex curved surface 84 of the second fixed member 48, which faces outwardly away from the gear teeth of the gear 34, and is thereby directed to a passage 86, for subsequent return to the sump section 14 without contacting the gear 34. A concave shaped surface 88 of the second fixed member 48 is directed toward the gear 34, and can be positioned at a spacing 90 from the outer gear teeth of the gear 34, such that fluid spun off from the gear 34 can also be directed into the passage 86.

The baffle 42 in an open position shown is impinged by a fluid such as oil or transmission fluid that is contacted by the gear teeth of the final drive gear 40 as it rotates through the sump section 14. The baffle 42 can be used for several purposes. These purposes include: 1) to direct substantially all of the oil spun off the gear teeth of the final drive gear 40 toward the gear 34 to lubricate the gear 34; 2) to direct a first portion of the oil spun off of the gear teeth of the final drive gear 40 as the second flow 74, toward the gear 34, and to bypass a second portion of the oil as the third flow 80 around or away from the mesh of gear 34; or 3) at high operating speeds of the final drive gear 40 to bypass substantially all of the oil spun off the gear teeth of the final drive gear 40 away from the gear 34.

The baffle 42 is preferably made from a polymeric material by a molding process, but can also be manufactured from other materials including metals or composite materials. The baffle 42 is preferably made using an injection molding process to accommodate the complex geometry of the flow surfaces described in detail above. Other materials and manufacturing methods can also be used within the scope of the present disclosure.

The baffle 42 will now be described in greater detail. With specific reference to FIG. 2 and again to FIG. 1, the door 52 and the first fixed member 46 of the baffle 42 are generally semi-circular in shape, having a radius of curvature $R_1$ larger than a radius of curvature $R_2$ of the gear teeth 44 of the final drive gear 40. The first fixed member 46 is fixed such as by fastening to structure in the central cavity 18. The door 52 is rotatably connected to the first fixed member 46 at a first end 92. The door 52 includes the curved surface 60 having the radius of curvature $R_2$ larger than the radius of curvature $R_1$ of the gear teeth 44 of the final drive gear 40, and substantially equal to a radius of curvature $R_3$ of the surface 62 of the first fixed member 46. In the closed position of the baffle 42 shown in FIG. 1, a second end 94 of the door 52 directly contacts the seating surface 58 of the second fixed member 48. The second fixed member 48 includes the concave shaped surface 88 facing toward the gear 34 having a radius of curvature $R_4$ larger than a radius of curvature of the teeth of the gear 34. The second fixed member 48 also includes the curved surface 84 facing away from the gear 34.

In the closed position of the baffle 42 shown in FIG. 1, the surface 60 of the door 52 and the surface 62 of the first fixed member 46 are each equidistantly spaced from the axis of rotation 64 of the final drive gear 40. This presents a substantially smooth surface for directing the flow of fluid in the direction of the second flow 74, which represents the fluid or oil captured by the gear teeth 44 prior to being discharged through the door 52 by centrifugal force during rotation of the final drive gear 40.

According to several aspects, the spring or biasing force of the hinge member 54 is predetermined such that an impingement force of the fluid acting against the surface 60 of the door 52 and opposite to the biasing direction of the hinge member 54 is predetermined based on a criteria including the fluid velocity occurring at a known or predetermined rotational velocity of the final drive gear 40. For example, a predetermined value of the impingement force of the fluid acting against the surface 60 can be used to fully open the door 52 when the rotational speed of the final drive gear 40 is approximately 50% of its maximum rotational speed. Using this criteria, the door 52 will move away from the closed position at a rotational speed of the final drive gear 40 less than 50% of its maximum rotational speed, thereby providing a gradual opening of the door 52. Concomitantly, under these conditions, the door 52 will begin to close when the rotational speed of the final drive gear 40 is less than 50% of its maximum rotational speed. A minimum rotational speed of the gear 40 (for example 25% of the maximum rotational speed) at which the door 52 is fully closed can also be predetermined, such that substantially all of the fluid flow moving in the direction of the total flow 68 will be directed toward the gear 34 below the minimum rotational speed of the final drive gear 40 at which the door 52 is fully closed.

With continuing reference to FIG. 2, a control system 96 can be provided, which can include a speed sensor 98 used to measure a rotational speed of the final drive gear 40. The control system can be connected to the hinge member 54, which according to several aspects can be configured as a mechanically or electronically controlled hinge, for example controlled by a motor or device actuated by a signal indicating the rotational speed of the final drive gear 40. The door 52 can be actuated to move away from the closed position to any open rotational degree based on the rotational speed of the final drive gear 40, such that the force of the fluid acting on the door 52 is not required to open the door 52.

It should be appreciated that other quantities and/or configurations of apertures or openings may be employed with the present disclosure, for example, a plurality of circumferential flow ports, without departing from the scope of the present disclosure.

The description of the disclosure is merely exemplary in nature and variations that do not depart from the gist of the disclosure are intended to be within the scope of the disclosure. Such variations are not to be regarded as a departure from the spirit and scope of the disclosure.

What is claimed is:
1. A variable baffle assembly for controlling a flow of oil at a gear mesh, comprising:
    a first baffle member fixed proximate to gear teeth of a first rotating gear;
    a second baffle member rotatably connected to the first baffle member; and a rotating member defining a biasing member rotatably connecting the second baffle member to the first baffle member, the second baffle member is displaced away from a closed position to an open position when a force of a fluid expelled from the gear teeth of the first rotating gear that directly contacts the rotating member exceeds a biasing force applied by the rotating member normally acting to move the second baffle member toward the closed position.

2. The variable baffle assembly for controlling a flow of oil at a gear mesh of claim 1, further including a third baffle member positioned proximate to the second baffle member and oppositely about the second baffle member with respect to the first baffle member, the third baffle member aligned with the second baffle member when the second baffle member is in the closed position.

3. The variable baffle assembly for controlling a flow of oil at a gear mesh of claim 2, wherein the third baffle member includes a portion defining a seating surface directly contacted by the second baffle member at the closed position of the second baffle member.

4. The variable baffle assembly for controlling a flow of oil at a gear mesh of claim 2, wherein the third baffle member includes a concave shaped surface facing toward a second rotating gear.

5. The variable baffle assembly for controlling a flow of oil at a gear mesh of claim 4, wherein the third baffle member includes a convex shaped surface facing away from the second rotating gear.

6. The variable baffle assembly for controlling a flow of oil at a gear mesh of claim 5, wherein a portion of the fluid expelled from the gear teeth of the first rotating gear is directed through an opening created between the second baffle member and the third baffle member when the second baffle member is displaced to the open position to impinge on and be redirected by the convex shaped surface away from the second rotating gear.

7. The variable baffle assembly for controlling a flow of oil at a gear mesh of claim 1, wherein the rotating member is a spring defining a hinge.

8. The variable baffle assembly for controlling a flow of oil at a gear mesh of claim 7, wherein the spring includes a spring arm contacting the second baffle member.

9. The variable baffle assembly for controlling a flow of oil at a gear mesh of claim 1, wherein the rotating member is an electronically operated hinge.

10. The variable baffle assembly for controlling a flow of oil at a gear mesh of claim 9, wherein the concave shaped surface of the door has a radius of curvature greater than a radius of curvature of the gear teeth.

11. The variable baffle assembly for controlling a flow of oil at a gear mesh of claim 1, wherein the second baffle member defines a door having a concave shaped surface facing the gear teeth of the rotating gear.

12. The variable baffle assembly for controlling a flow of oil at a gear mesh of claim 1, further comprising a control system, connected to and directing movement of the rotating member.

13. The variable baffle assembly for controlling a flow of oil at a gear mesh of claim 12, wherein the control system includes a speed sensor operating to measure a rotational speed of the first rotating gear.

14. A variable baffle assembly for controlling a flow of oil at a gear mesh, comprising:
a first baffle member fixed proximate to gear teeth of a first rotating gear;
a second baffle member rotatably connected to the first baffle member;
a third baffle member fixed proximate to a second rotating gear and aligned with the second baffle member when the second baffle member is in a closed position; and
a rotating member rotatably connecting the second baffle member to the first baffle member, the second baffle member moved away from the closed position to an open position when a force of a fluid expelled from the gear teeth of the first rotating gear that directly contacts the rotating member exceeds a force applied to the rotating member normally acting to move the second baffle member toward the closed position.

15. The variable baffle assembly for controlling a flow of oil at a gear mesh of claim 14, wherein the third baffle member includes a convex shaped surface facing away from the second rotating gear.

16. The variable baffle assembly for controlling a flow of oil at a gear mesh of claim 15, wherein a portion of the fluid expelled from the gear teeth of the first rotating gear is directed through an opening created between the second baffle member and the third baffle member when the second baffle member is displaced to the open position, the portion of the fluid directed toward the convex shaped surface to impinge on and be redirected by the convex shaped surface away from the second rotating gear.

17. The variable baffle assembly for controlling a flow of oil at a gear mesh of claim 14, wherein a concave shaped surface of the second baffle member facing toward the first rotating gear has a radius of curvature greater than a radius of curvature of the gear teeth of the first rotating gear.

18. The variable baffle assembly for controlling a flow of oil at a gear mesh of claim 17, wherein a concave shaped surface of the first baffle member facing toward the first rotating gear is aligned with the concave shaped surface of the second baffle in the second baffle member closed position, the concave shaped surface of the first baffle member having a radius of curvature greater than the radius of curvature of the gear teeth of the first rotating gear.

19. A variable baffle assembly for controlling a flow of oil at a gear mesh, comprising:
a first fixed baffle member fixed proximate to gear teeth of a first rotating gear, the first fixed baffle member having a radius of curvature larger than a radius of curvature of the first rotating gear;
a door rotatably connected to the first fixed baffle member, the door having a radius of curvature larger than the radius of curvature of the first rotating gear;
a second fixed baffle member positioned away from the first fixed baffle member and directly contacted by the door when the door is in a closed position; and
a hinge member rotatably connecting the door to the first fixed baffle member, the door movable away from the closed position to an open position when the force of a fluid expelled from the gear teeth of the first rotating gear that directly contacts the door exceeds a biasing force applied by the hinge member to the door normally acting to bias the door toward the closed position.

* * * * *